(12) United States Patent
Moon

(10) Patent No.: US 8,525,806 B2
(45) Date of Patent: Sep. 3, 2013

(54) ORGANIC LIGHT EMITTING DIODE DISPLAY DEVICE INCLUDING TOUGH PANEL

(75) Inventor: Chan-Kyoung Moon, Yongin (KR)

(73) Assignee: Samsung Display Co., Ltd., Yongin, Gyeonggi-Do (KR)

( * ) Notice: Subject to any disclaimer, the term of this patent is extended or adjusted under 35 U.S.C. 154(b) by 408 days.

(21) Appl. No.: 12/801,537

(22) Filed: Jun. 14, 2010

(65) Prior Publication Data

US 2011/0018823 A1 Jan. 27, 2011

(30) Foreign Application Priority Data

Jul. 21, 2009 (KR) .................... 10-2009-0066477

(51) Int. Cl.
*G06F 3/041* (2006.01)

(52) U.S. Cl.
USPC ............................ 345/173; 345/76

(58) Field of Classification Search
USPC .. 345/76–87, 156–179, 204–206; 178/18.01; 315/169.3
See application file for complete search history.

(56) References Cited

U.S. PATENT DOCUMENTS

| 6,707,450 | B2 * | 3/2004 | Ahn et al. ..................... 345/173 |
| 7,110,247 | B2 | 9/2006 | Kim et al. |
| 7,292,290 | B2 * | 11/2007 | Miyagawa et al. ............. 349/58 |
| 2009/0322699 | A1 * | 12/2009 | Hansson ....................... 345/174 |
| 2010/0045891 | A1 | 2/2010 | Oh |

FOREIGN PATENT DOCUMENTS

| JP | 2001-021869 | | 1/2001 |
| JP | 2001-356323 | | 12/2001 |
| JP | 2004-264938 | A | 9/2004 |
| JP | 2006-154401 | | 6/2006 |
| JP | 2007-310685 | | 11/2007 |
| JP | 2009-020140 | | 1/2009 |
| JP | 2009-069335 | | 2/2009 |
| JP | 2010521713 | A | 6/2010 |
| KR | 10 2001-0094773 | A | 11/2001 |
| KR | 10-2006-0114596 | A | 11/2006 |
| KR | 10-2007-0044721 | A | 4/2007 |
| KR | 10 2008-0048870 | A | 6/2008 |
| KR | 10 2008-0071637 | A | 8/2008 |
| KR | 10 2009-0048183 | A | 5/2009 |
| WO | WO-2008/117960 | A1 | 10/2008 |

* cited by examiner

*Primary Examiner* — William Boddie
*Assistant Examiner* — Mansour M Said
(74) *Attorney, Agent, or Firm* — Lee & Morse, P.C.

(57) ABSTRACT

An OLED display device includes a display panel configured to display an image, a touch panel on a first surface of the display panel, a frame covering side surfaces of the display panel, and an adhesive tape connecting the touch panel both to the frame and the display panel.

19 Claims, 2 Drawing Sheets

ORGANIC LIGHT EMITTING DIODE DISPLAY DEVICE INCLUDING TOUGH PANEL

BACKGROUND

1. Field

Example embodiments relate to an organic light emitting diode (OLED) display device having a touch panel. More particularly, example embodiments relate to an OLED display device having a display panel configured to display an image that is combined with a touch panel with sufficient strength and without an increase in total thickness.

2. Description of the Related Art

Flat panel display devices are used as alternatives to cathode-ray tube display devices due to their light weight and low thickness. Such flat panel display devices may include, e.g., liquid crystal display (LCD) devices and OLED display devices. For example, as compared to the LCD devices, the OLED display devices have excellent brightness and a wide viewing angle. Further, the OLED display devices may be formed in a very slim design because the OLED display devices do not need a backlight.

The OLED display devices may be classified into a passive matrix type and an active matrix type according to the operating method. The active matrix type has a circuit using a thin film transistor (TFT).

The OLED display devices may include digitizers, e.g., a touch panel disposed at one side of a display panel for a user to select desired information while looking at an image displayed on the display panel. The touch panel may be capable of inputting characters or images by digitally detecting a location of a finger or a pen and outputting the location in accordance with (x,y) coordinates.

SUMMARY

Embodiments are directed to an OLED display device having a touch panel, which substantially overcomes one or more of the problems due to the limitations and disadvantages of the related art.

It is therefore a feature of an embodiment to provide an OLED display device having a display panel sufficiently secured to a touch panel without an increase in a total thickness thereof.

It is therefore another feature of an embodiment to provide an OLED display device having a display panel sufficiently secured to a touch panel without triggering deformation of the touch panel.

At least one of the above and other features and advantages may be realized by providing an OLED display device, including a display panel configured to display an image, a touch panel disposed at one side of the display panel, a frame covering side surfaces of the display panel, and an adhesive tape connecting the touch panel both to the frame and the display panel.

The display panel may include a display portion displaying an image and a non-display portion external to the display portion, the adhesive tape being between the non-display portion of the display panel and the touch panel. The adhesive tape may include a first portion between the touch panel and the frame and a second portion between the touch panel and the display panel, the first and second portions being integral. The second portion of the adhesive tape may overlap only the non-display portion of the display panel. The adhesive tape may overlap the entire frame and an entire non-display portion of the display panel. A width of the adhesive tape may substantially equal a sum of width of the entire frame and a width of a non-display portion of the display panel, the widths of the frame and non-display portion being measured from respective side surfaces of the display panel. The OLED may further include a polarizing film between a display portion of the display panel and the touch panel. The polarizing film may have a substantially same area as the display portion. The polarizing film may have a substantially same thickness as the adhesive tape, the polarizing film overlapping only the display portion.

The frame may have a substantially same thickness as the display panel. The frame and the display panel may define a structure having a substantially flat surface, the flat surface including the first surface of the display panel, and the touch panel overlapping the entire flat surface. The adhesive tape may be between the touch panel and the flat surface, the adhesive tape being external to a region overlapping a display area of the display panel. The frame may include plastic. The OLED may further include a protective film disposed on a second surface of the display panel, the second surface being opposite the first surface. The protective film may include a shock-absorbing tape. An external perimeter of the frame may be substantially the same as a perimeter of the touch panel. The touch panel may include a first substrate having a lower electrode, a second substrate facing the first substrate to selectively transmit incident light, and a spacing member disposed between the first and second substrates. The second substrate may include a polarizing layer. The spacing member may be a dotted spacer. The spacing member may include an insulating material.

BRIEF DESCRIPTION OF THE DRAWINGS

The above and other features and advantages will become more apparent to those of ordinary skill in the art by describing in detail exemplary embodiments with reference to the attached drawings, in which.

DETAILED DESCRIPTION

Figure 1:
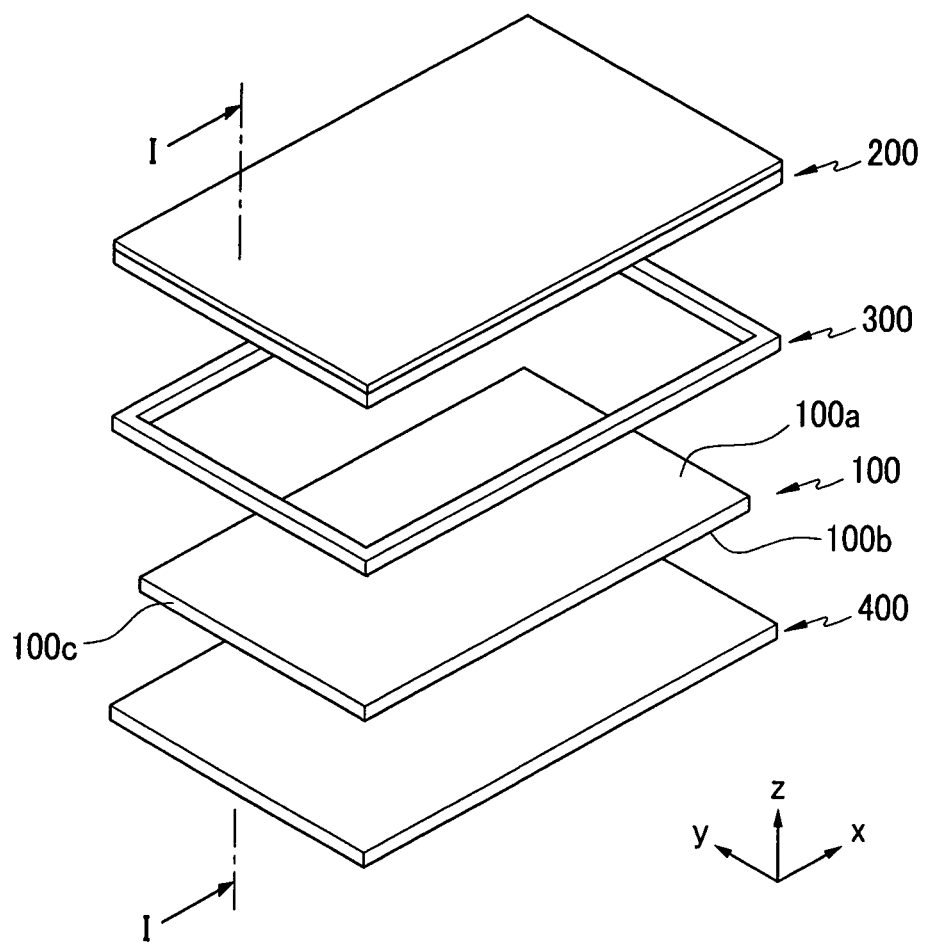
FIG. 1 illustrates an exploded perspective view of an OLED display device according to an example embodiment.

Korean Patent Application No. 10-2009-0066477, filed on Jul. 21, 2009, in the Korean Intellectual Property Office, and entitled: "Organic Light Emitting Diode Display Device Including Touch Panel," is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers, elements, and regions may be exaggerated for clarity of illustration. It will also be understood that when a layer or element is referred to as being "on" another layer, element, or substrate, it can be directly on the other layer/element or substrate, or intervening layers/elements may also be present. In addition, it will also be understood that when a layer/element is referred to as being "between" two layers/elements, it can be the only layer/element between the two layers/elements, or one or more intervening layers/elements may also be present. Further, it will also be understood that when a layer/element is referred to as being "connected" to another layer/element, the connected parts may be "physically connected," "electrically connected," "directly connected," and/or connected via additional elements to each other. Like reference numerals refer to like elements throughout.

An example embodiment of an OLED display device will now be described with reference to FIGS. 1-2. FIG. 1 illustrates an exploded perspective view of an OLED display device, and FIG. 2 illustrates a cross-sectional view taken along line I-I' of FIG. 1.

Figure 2:
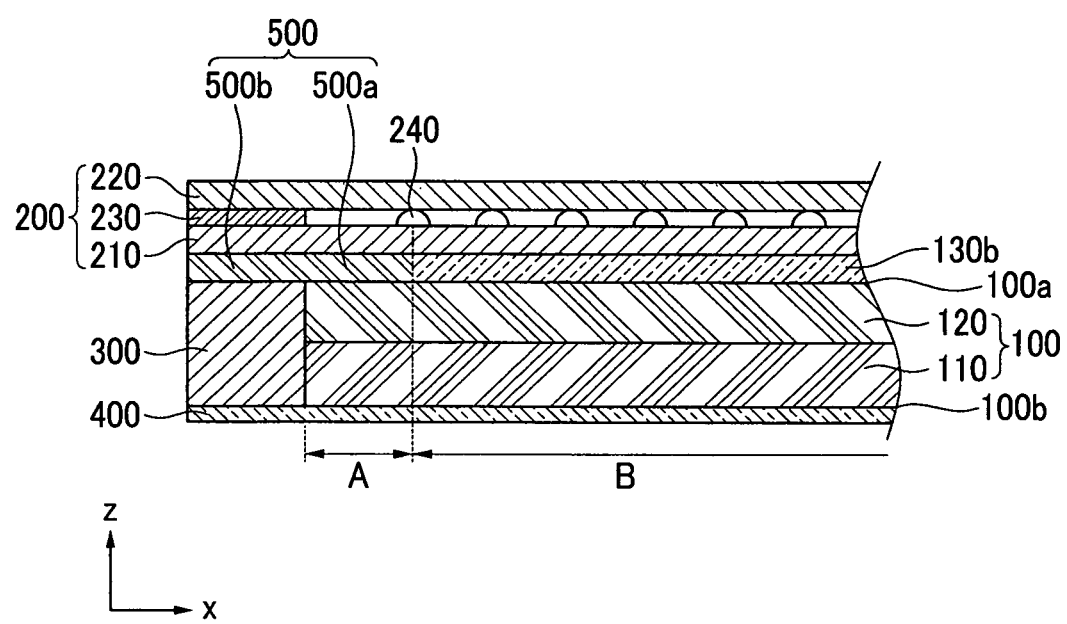
FIG. 2 illustrates a cross-sectional view taken along line I-I' of FIG. 1.

Referring to FIGS. 1 and 2, the OLED display device may include a display panel 100 having a display portion B configured to display an image and a non-display portion A disposed outside the display portion B, a touch panel 200 disposed at one side of the display panel 100, and a frame 300 covering side faces of the display panel 100. The OLED display device according to an exemplary embodiment may further include a protective film 400 disposed on the other side of the display panel 100 in order to protect the display panel 100 from external impact and prevent detachment of the frame 300 from the display panel 100.

Referring to FIG. 1, the display panel 100 may have a first surface 100a facing the touch panel 200, a second surface 100b opposite the first surface 100a, and side surfaces 100c connecting the first and second surfaces 100a and 100b, e.g., sidewalls in the yz-plane. It is noted that the first and second surfaces 100a and 100b of the display panel 100 are major surfaces, e.g., in the xy-plane, and have a substantially larger surface area than the side surfaces 100c, i.e., sufficient surface area to display an image. As illustrated in FIG. 2, the display panel 100 may include a first substrate 110 and a second substrate 120 attached to the first substrate 110 to seal the OLED display device, e.g., the first surface 100a may be an external surface of the second substrate 120 and the second surface 100b may be an external surface of the first substrate 110. The first substrate 100 may have the display portion B having one or more OLEDs (not shown) for displaying images and the non-display portion A outside the display portion B, e.g., surrounding the display portion B, to control the OLED display device. The first substrate 110 may include one or more TFTs to operate the OLED display device, e.g., through the display portion B.

As further illustrated in FIG. 2, the touch panel 200 may include a lower substrate 210 having a lower conductive layer (not shown), an upper substrate 220 having an upper conductive layer (not shown) facing the lower substrate 210, a spacing member 240 disposed between the lower substrate 210 and the upper substrate 220, and a first adhesive tape 230 disposed at edges of the lower and upper substrates 210 and 220 to attach the lower substrate 210 to the upper substrate 220. The touch panel 200 may be on a first surface 100a of the display panel 100, so, e.g., the lower substrate 210 of the touch panel 200 may be on the first surface 100a, i.e., on the second substrate 120, of the display panel 100. For example, the lower substrate 210 of the touch panel 200 may overlap, e.g., completely overlap, the first surface 100a of the display panel 100. For example, the touch panel 200 may be longer than the display panel 100, so the touch panel 200 may overlap the display portion B and the non-display portion A of the display panel 100, and may extend to protrude beyond the display panel 100, as will be discussed in more detail below with reference to the frame 300.

The lower and upper substrates 210 and 220 of the touch panel 200 may be, e.g., glass substrates or films formed of a flexible polymer resin. The upper substrate 220 may further include a polarizing layer (not shown) selectively transmitting external light incident thereon, i.e., light external to the OLED display device. Edges of the lower and upper substrates 210 and 220 may include a lower electrode and an upper electrode electrically connected to the lower and upper conductive layers, respectively, and an electrode lead line (not shown) electrically connected to the upper or lower electrode to detect an external signal input by a finger or a pen, i.e., to determine location of contact of the finger or pen on the touch panel 200 in terms of x-y coordinates. The detected signal, e.g., the x-y coordinates, may be transmitted to the display panel 100.

The spacing member 240 may maintain a predetermined distance between the lower substrate 210 and the upper substrate 220. For example, as illustrated in FIG. 2, the spacing member 240 may be formed in the shape of several dot spacers, and may be formed of an insulating material to prevent unnecessary electric connection between the lower conductive layer of the lower substrate 210 and the upper conductive layer of the upper substrate 220.

As further illustrated in FIGS. 1-2, the frame 300 may cover side surfaces 100c of the display panel 100 and may cover peripheral portions of the touch panel 200 to sufficiently connect the display panel 100 to the touch panel 200. For example, the frame 300 may surround, e.g., completely surround, a perimeter of the display panel 100 to overlap the side surfaces 100c, e.g., four side surfaces 100c, of the display panel 100. The frame 300 may contact, e.g., directly contact, the side surfaces 100c, e.g., only the side surfaces 100c, of the display panel 100. For example, a thickness of the frame 300, e.g., along the z-axis, may be substantially the same as a thickness of the display panel 100, i.e., along the z-axis, so the display panel 100 may fit in the frame 300 to define a structure with substantially coplanar surfaces in the xy-plane. An external perimeter of the frame 300 may be the same as the perimeter of the touch panel 200 to prevent the touch panel 200 from being bent toward the display panel 100, e.g., the touch panel 200 and the display panel 100 surrounded by the frame 300 may overlap, e.g., completely overlap, each other.

The frame 300 may be formed of any material capable of increasing connection strength between the display panel 100 and the touch panel 200, but may be formed of a lightweight material, e.g., plastic, to prevent an increase in total weight of the OLED display device. The display panel 100 surrounded by the frame 300 may be on the protective film 400, i.e., the protective film 400 may be on, e.g., directly on, the second surface 100b of the display panel 100, and may increase stability of the frame 300 around the display panel 100. For example, the protective film 400 may include a shock-absorbing tape.

A second adhesive tape 500 may be disposed between the touch panel 200 and the display panel 100 surrounded by the frame 300 to attach the display panel 100 to the touch panel 200. For example, the second adhesive tape 500 may be on, e.g., directly on, a peripheral portion of the lower substrate 210 of the touch panel 200, and may contact, e.g., directly contact, the non-display portion A of the display panel 100, i.e., the first surface 100a, and the frame 300 to combine the display panel 100 to the touch panel 200. In other words, the second adhesive tape 500 may include a first portion 500a, e.g., directly, between the touch panel 200 and the non-display portion A of the display panel 100 and a second portion 500b, e.g., directly, between the touch panel 200 and the frame 300. The first and second portions 500a and 500b may be continuous and integral with each other to define a single adhesive tape. The second adhesive tape 500 may, e.g., directly, connect the touch panel 200, the display panel 100, and the frame 300, thereby increasing a total surface area of an adhesive to increase connection strength, while maintaining the adhesive outside the display area with a relatively small overall thickness of the OLED display device.

For example, the second adhesive tape 500 may be applied on the entire frame 300 to overlap the entire non-display portion A of the display panel 100. For example, as illustrated in FIG. 2, a width of the second adhesive 500, e.g., along the x-axis, may substantially equal a sum of a width of the frame 300, i.e., as measured from a corresponding side surface 100c, and a width of the non-display portion A of the display panel 100, i.e., as measured from a corresponding side surface 100c. As the second adhesive tape 500 may be, e.g., only, on the non-display portion A of the display panel 100, i.e., not on the display portion B, image brightness may be increased and image distortion may be prevented or substantially minimized.

A polarizing film 130 may be disposed, e.g., only, between the display portion B of the display panel 100 and the touch panel 200 to improve brightness of an image displayed on the display panel 100. For example, the polarizing film 130 may have a surface area that substantially equals and overlaps the surface area of the display portion B of the display panel 100.

If the surface area of the polarizing film 130 is smaller than that of the display portion B of the display panel 100 in area, it may be difficult to uniformly improve brightness of an image displayed on the display panel 100. If the surface area of the polarizing film 130 is larger than that of the display portion B of the display panel 100, the polarizing film 130 may overlap the second adhesive tape 500, e.g., in a certain region of the non-display portion A of the display panel 100, thereby increasing a total thickness of the OLED display device. Further, if the polarizing film 130 overlaps the second adhesive tape 500, an unnecessary space may be generated between the display panel 100 and the touch panel 200, thereby bending the touch panel and/or distorting an image displayed on the display portion B of the display panel 100.

Therefore, the polarizing film 130 according to example embodiments, as illustrated in FIG. 2, may have a substantially same surface area as the display portion B of the display panel 100. Further, the polarizing film 130 according to example embodiments, as illustrated in FIG. 2, may have a substantially same thickness, e.g., along the z-axis, as that of the adhesive tape 500, e.g., along the z-axis.

An OLED display device according to example embodiments may include a frame covering, e.g., only, side surfaces of a display panel to define a flat plane, so a touch panel may be attached to a non-display portion of the display panel and the frame at the flat plane. As such, a connection between the display panel and the touch panel may be sufficiently strong without an increase in a total thickness of the OLED display device. In contrast, e.g., when a touch panel having a larger area than that of the display panel is conventionally attached only to a non display area of the display panel, i.e., without a frame, the connection between the display panel and the touch panel may be insufficient. Further, when a conventional display panel is accommodated in a container to provide a sufficiently secure connection between the display panel and the touch panel, a total thickness of a resultant OLED display device may be increased.

Exemplary embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. An organic light emitting diode (OLED) display device, comprising:
   a display panel configured to display an image;
   a touch panel on a first surface of the display panel;
   a frame covering side surfaces of the display panel; and
   an adhesive tape connecting the touch panel both to the frame and the display panel,
   wherein a width of the adhesive tape substantially equals a sum of a width of the frame and a width of a non-display portion of the display panel, the widths of the frame and non-display portion being measured from respective side surfaces of the display panel.

2. The OLED display device as claimed in claim 1, wherein the display panel includes a display portion displaying an image and a non-display portion external to the display portion, the adhesive tape being between the non-display portion of the display panel and the touch panel.

3. The OLED display device as claimed in claim 1, wherein the adhesive tape includes a first portion between the touch panel and the frame and a second portion between the touch panel and the display panel, the second portion of the adhesive tape overlapping only the non-display portion of the display panel, and the first and second portions being integral.

4. The OLED display device as claimed in claim 1, wherein the adhesive tape overlaps an entire surface area of the frame and of a non-display portion of the display panel, the surface area facing the touch panel.

5. The OLED display device as claimed in claim 1, further comprising a polarizing film between a display portion of the display panel and the touch panel.

6. The OLED display device as claimed in claim 5, wherein the polarizing film has a substantially same area as the display portion.

7. The OLED display device as claimed in claim 1, wherein the frame has a substantially same thickness as the display panel.

8. The OLED display device as claimed in claim 7, wherein the frame and the display panel define a structure having a substantially flat surface, the flat surface including the first surface of the display panel, and the touch panel overlapping the entire flat surface.

9. The OLED display device as claimed in claim 1, wherein the frame includes plastic.

10. The OLED display device as claimed in claim 1, further comprising a protective film disposed on a second surface of the display panel, the second surface being opposite the first surface.

11. The OLED display device as claimed in claim 10, wherein the protective film includes a shock-absorbing tape.

12. The OLED display device as claimed in claim 1, wherein an external perimeter of the frame is substantially the same as a perimeter of the touch panel.

13. The OLED display device as claimed in claim 1, wherein the touch panel includes a first substrate having a lower electrode, a second substrate facing the first substrate to selectively transmit incident light, and a spacing member disposed between the first and second substrates.

14. The OLED display device as claimed in claim 13, wherein the second substrate includes a polarizing layer.

15. The OLED display device as claimed in claim 13, wherein the spacing member is a dotted spacer.

16. The OLED display device as claimed in claim 13, wherein the spacing member includes an insulating material.

17. The OLED display device as claimed in claim 1, wherein:

the frame is only on the side surface of the display panel, the first surface of the display panel and the first surface of the frame being substantially level, and the touch panel continuously overlaps the first surface of the display panel and the first surface of the frame.

18. An organic light emitting diode (OLED) display device, comprising:

a display panel configured to display an image;

a touch on a first surface of the display panel;

a frame covering side surfaces of the display panel;

a polarizing film between a display portion of the display panel and the touch panel, the polarizing film having substantially same area as the display portion; and an adhesive tape connecting the touch panel both to the frame and the display panel, wherein the polarizing film has a substantially same thickness as the adhesive tape, the polarizing film overlapping only the display portion.

19. An organic light emitting diode (OLED) display device, comprising:

a display panel configured to display an image;

a touch panel on a first surface of the display panel;

a frame covering side surfaces of the display panel, the frame having a substantially same thickness as the display panel; and an adhesive tape connecting the touch panel both to the frame and the display panel, wherein the frame and the display panel define a structure having a substantially flat surface, the flat surface including the first surface of the display panel, and the touch panel overlapping the entire flat surface, and wherein the adhesive tape is between the touch panel and the flat surface, the adhesive tape being external to a region overlapping a display area of the display panel.

* * * * *